(12) United States Patent
Jeanne et al.

(10) Patent No.: US 8,477,768 B2
(45) Date of Patent: Jul. 2, 2013

(54) DATA TRANSFER SYSTEM AND ASSOCIATED PRODUCTS

(75) Inventors: Ludovic Jeanne, Rennes (FR); Patrick Fontaine, Rennes (FR); Renaud Dore, Rennes (FR)

(73) Assignee: Thomson Licensing, Issy-les-Moulineaux (FR)

( * ) Notice: Subject to any disclaimer, the term of this patent is extended or adjusted under 35 U.S.C. 154(b) by 516 days.

(21) Appl. No.: 11/327,698

(22) Filed: Jan. 6, 2006

(65) Prior Publication Data

US 2007/0230503 A1 Oct. 4, 2007

(30) Foreign Application Priority Data

Jan. 13, 2005 (EP) .................................. 05300031

(51) Int. Cl.
*G06F 5/00* (2006.01)
*G06F 15/16* (2006.01)

(52) U.S. Cl.
USPC ................ 370/360; 710/52; 710/58; 709/234

(58) Field of Classification Search
USPC ............. 710/3, 35, 52, 58; 370/412; 709/234; 365/189.05, 189.14
See application file for complete search history.

(56) References Cited

U.S. PATENT DOCUMENTS

| | | | | |
|---|---|---|---|---|
| 5,806,084 A * | 9/1998 | Lin et al. | ........................ | 711/110 |
| 5,884,099 A * | 3/1999 | Klingelhofer | .................... | 710/52 |
| 5,987,543 A * | 11/1999 | Smith | .............................. | 710/70 |
| 6,611,538 B1 * | 8/2003 | Malerevich et al. | .......... | 370/503 |
| 6,622,222 B2 * | 9/2003 | Arimilli et al. | ................ | 711/154 |
| 6,829,670 B1 * | 12/2004 | Nakamura | ..................... | 710/310 |
| 6,892,287 B1 * | 5/2005 | Millard et al. | ................. | 711/158 |
| 6,977,941 B2 * | 12/2005 | Takahashi et al. | ............. | 370/412 |
| 7,073,001 B1 * | 7/2006 | Kucharewski et al. | ....... | 710/105 |
| 7,254,677 B1 * | 8/2007 | Lowe et al. | .................... | 711/118 |
| 7,362,771 B1 * | 4/2008 | Lo et al. | ......................... | 370/429 |
| 7,529,959 B1 * | 5/2009 | Boduch | .......................... | 713/400 |
| 7,606,933 B2 * | 10/2009 | Reinhard et al. | ............... | 709/238 |
| 7,831,653 B2 * | 11/2010 | Nation et al. | .................. | 709/200 |
| 2001/0009551 A1 * | 7/2001 | Moriwaki et al. | ............. | 370/395 |
| 2003/0063684 A1 * | 4/2003 | Czekaj et al. | .................. | 375/295 |
| 2003/0091035 A1 * | 5/2003 | Roy et al. | ...................... | 370/353 |
| 2003/0110339 A1 * | 6/2003 | Calvignac et al. | ............. | 710/305 |

(Continued)

OTHER PUBLICATIONS

Jacob Levinson and Ichiro Kuroda, "An Asynchronous Communication Protocol for Internode Connections in a Scalable Processor Array", Oct. 20, 1993. pp. 489-497, XP010140377.

(Continued)

*Primary Examiner* — Ernest Unelus
(74) *Attorney, Agent, or Firm* — Myers Wolin, LLC

(57) ABSTRACT

The present invention concerns a data transfer system for transferring data signals between a system input and a system output, and associated products.

The system comprises a first data consuming set, receiving the data signals (SGNL1) from the system input, writing them therein and reading them for sending them towards a second data consuming set, the second set receiving the data signals (SGNL0), writing them therein and reading them for sending them (SGNL2) to the system output, and transfer means transferring the data signals from the first to the second data consuming set.

The first set incorporates within the data signals to be transmitted, read requests (rd_req1) for reading the data signals from the first data consuming set. The transfer means carry those read requests with the data signals, and the second set receives them for synchronization between the first and second sets.

9 Claims, 3 Drawing Sheets

U.S. PATENT DOCUMENTS

| | | | |
|---|---|---|---|
| 2003/0202383 A1* | 10/2003 | Shiota et al. | 365/185.33 |
| 2004/0202169 A1* | 10/2004 | Mukouyama et al. | 370/395.1 |
| 2004/0202205 A1* | 10/2004 | Sheth et al. | 370/539 |
| 2004/0252083 A1* | 12/2004 | Watanabe et al. | 345/74.1 |
| 2004/0252684 A1* | 12/2004 | Evans et al. | 370/389 |
| 2005/0010690 A1* | 1/2005 | Marshall et al. | 709/246 |
| 2007/0019660 A1* | 1/2007 | Primrose et al. | 370/412 |
| 2008/0031385 A1* | 2/2008 | Aung et al. | 375/316 |
| 2008/0104313 A1* | 5/2008 | Chu | 711/104 |

OTHER PUBLICATIONS

Search Report.

\* cited by examiner

DATA TRANSFER SYSTEM AND ASSOCIATED PRODUCTS

FIELD OF THE INVENTION

The present invention relates to a data transfer system for transferring data signals between a system input and a system output, as well as data consuming sets, FPGAs (for "Field Programmable Gate Array") and an optical transmission component.

DESCRIPTION OF THE PRIOR ART

With the new FPGAs, it is possible to map easily a big hardware design on an FPGA platform. Such a platform often contains several FPGAs interconnected between them by general-purpose signals. Because the number of the required signals is always increasing, FPGA vendors are adding some complex features on their I/O systems (for "In/Out"), so as to transport more information between two communicating FPGAs. For instance, they have developed fast I/O, LVDS I/O cells (for "Low Voltage Differential Signalling"), etc.

Some specific difficulties happen when two communicating FPGAs do not share synchronized clocks. Notably, in wireless apparatus, two big interconnected FPGAs can be efficiently used in an appropriate platform:
  one for a MAC layer (for "Medium Access Control"), working with a local clock of the apparatus (as well as upper layers);
  and one for a PHY layer (for "PHYsical"), mainly working with a clock coming from an RF (for "Radio Frequency") front end.

Now, some latency has to be taken into account in the FPGAs. Notably, the change of clock domain can be processed by means of FIFOs ("First In, First Out" memories). Each of those FIFOs can then work with a read port and a write port clocked with a different clock. The control signals of such FIFOs, like notably "empty/almost empty" on read access and "full/almost full" on write access, are delayed to take into account FIFO latency.

Also, some LVDS cells may prove useful to reduce the number of transmitted signals. Then, they introduce further latency on the transported signals, since the latter are delayed through the LVDS cells and possibly the LVDS lines.

This leads to cumulated delays, some of them generated by the vendor cell and possibly signals propagation, and some others by clock domain-decoupling FIFOs.

To deal with this difficulty, a solution would consist in exploiting control logics in both FPGAs, communicating together so as to obtain correct signals synchronization between them. However, this involves rather complex developments and implementation.

SUMMARY OF THE INVENTION

The present invention relates to a data transfer system making possible to manage the transmission delays between two interconnected FPGAs, so as to ensure correct synchronization in case of different clocks, or of significant propagation delays. This data transfer system is liable to be implemented with a simplified control logic keeping the full bandwidth.

More generally, the invention applies to a data transfer system for transferring data signals between a system input and a system output, through at least two data consuming sets. This data transfer system can make possible to obtain good and safe synchronization, with rather simple and economic implementation.

The invention also pertains to data consuming sets liable to be used in the data transfer system of the invention, as well as to corresponding FPGAs and optical transmission component.

The invention has applications notably in the wireless transmission field, but also for optical transmission systems.

To this end, the invention relates to a data transfer system for transferring data signals between a system input and a system output. This system comprises:
  a first data consuming set, designed to receive the data signals from the system input, to write the data signals in the first data consuming set, and to read the data signals from the first data consuming set for sending the data signals towards a second data consuming set,
  the second data consuming set, designed to receive the data signals from the first data consuming set, to write the data signals in the second data consuming set, and to read the data signals from the second data consuming set for sending the data signals to the system output,
  and transfer means for transferring the data signals from the first data consuming set to the second data consuming set.

According to the invention, the first data consuming set is designed to incorporate within the data signals to be transmitted to the second data consuming set, read requests for reading the data signals from the first data consuming set, the transfer means are designed to carry the read requests with the data signals, and the second data consuming set is designed to receive the read requests for synchronization between the first and second data consuming sets.

Thus, by contrast with known systems and very surprisingly with respect to usual practice, the read requests normally local to the first data consuming set are transmitted to the second data consuming set for synchronization.

This proves a solution at the same time rather easy to implement, and very efficient. More specifically, the transmitted read request can be used as write request in the second data consuming set, after the transport between both sets.

Further, a single control logic, implemented in either of the data consuming sets, can be designed to drive the read requests in the first data consuming set. This may be based on inputs consisting in control signals of both sets, and on the knowledge of the maximum generated latency.

The data transfer system may finally appear as a unique data consuming set having a global latency taking into account the various local latencies inside, namely as a synthetic "black box".

Notably, in preferred embodiments in which each of the data consuming sets includes a FIFO and an LVDS cell, the data transfer system can have globally the behaviour of a unique FIFO having latency equal to the latency of the whole system.

The term "consuming" refers to the use of the received data for processing or storing, involving the introduction of a delay between input and output.

The terms "data signals" are commonly used for the signals received by the first set, transferred between the first and the second set, and transmitted from the second set, without distinction. Indeed, they concern the same contents, the data transfer system having essentially a transmission function. However, the form of those data signals at each step can be changed, and is in fact advantageously modified.

In particular, the data signals transferred between the first and second sets are preferably grouped, so as to yield a restricted number of paths between the sets. This may improve the transfer speed and efficiency. On the other hand, the data signals are then advantageously ungrouped before being transmitted from the second set, so as to obtain a desired signals distribution.

For brevity and simplicity, anyway, the same terms "data signals" are used throughout the present disclosure.

Preferably, the data transfer system comprises delaying means for delaying the writing in the second data consuming set of the data signals read from the first data consuming set. These include advantageously first and second LVDS cells respectively in the first data consuming set downstream the reading of the data signals and in the second data consuming set upstream the writing of the data signals.

Also preferably:
the first data consuming set is designed to exploit a same first clock for writing the data signals in the first data consuming set and for reading the data signals from the first data consuming set,
while the second data consuming set is designed to exploit a second writing clock for writing the data signals in the second data consuming set and a second reading clock for reading the data signals from the second data consuming set.

Then, the second writing clock is advantageously derived from the first clock by means of the transmitted read requests.

In preferred embodiments, the data transfer system comprises a control unit included in one only of the first and second data consuming sets, the control unit being designed to control execution of the read requests in the first data consuming set.

In a first advantageous embodiment with this control unit in one of the sets, the control unit is included in the first data consuming set, and the second data consuming set and transfer means are designed to transfer to the control unit information on a filling state in the second data consuming set.

This information consists typically in signals related to a "full" and/or "almost full" state of the second data consuming set. The control unit then advantageously further receives information on an emptying state inside the first data consuming set.

In a second advantageous embodiment with this control unit in one of the sets, the control unit is included in the second data consuming set, and the first data consuming set and transfer means are designed to transfer to the control unit information on an emptying state in the first data consuming set.

This information consists typically in signals related to an "empty" and/or "almost empty" state of the first data consuming set. The control unit then advantageously further receives information on a filling state inside the second data consuming set.

In particularly useful embodiments, the first and second data consuming sets include respectively a first and a second FIFO memory.

In alternative embodiments, other types of hardware blocks are used in the data consuming sets, which generate and/or exploit the data.

In advantageous embodiments, the data transfer system comprises a MAC layer including the first data consuming set and a PHY layer including the second data consuming set.

Further, the second data consuming set is advantageously provided for sending the data signals to an RF front-end, though other applications may be very interesting, too.

Notably, a special application is a professional camera, such as a television camera, able to transmit video streams (with possibly high definition) through wireless, to broadcast systems.

Wireless transmission can be executed notably by a standard technique such as Wimax (as defined by IEEE 802.16).

Another object of the invention is a data consuming set, designed to be used as the first or the second data consuming set in a data transfer system according to any embodiment of the invention.

Such a data consuming set has specificities linked to the special use of the transmitted read requests, either for its sending (first set), or for its reception and exploitation for synchronization (second set).

The invention also relates to an FPGA, wherein it comprises the first or the second data consuming set according to any embodiment of the invention.

The first and second sets can also be implemented in other components, such as for example ASICs (for "Application Specific Integrated Circuit").

A further object of the invention is an optical transmission component, wherein it comprises the first or the second data consuming set according to any embodiment of the invention.

In an achievement corresponding thereto, an optical physical layer can be used instead of the wireless physical layer detailed in the present description, the wireless transmission from the second set being replaced by transmission through optical fibers.

BRIEF DESCRIPTION OF THE DRAWINGS

The invention will be better understood and illustrated by means of the following embodiment and execution examples, in no way limitative, with reference to the appended figures on which.

DETAILED DESCRIPTION OF THE PREFERRED EMBODIMENTS

Figure 1:
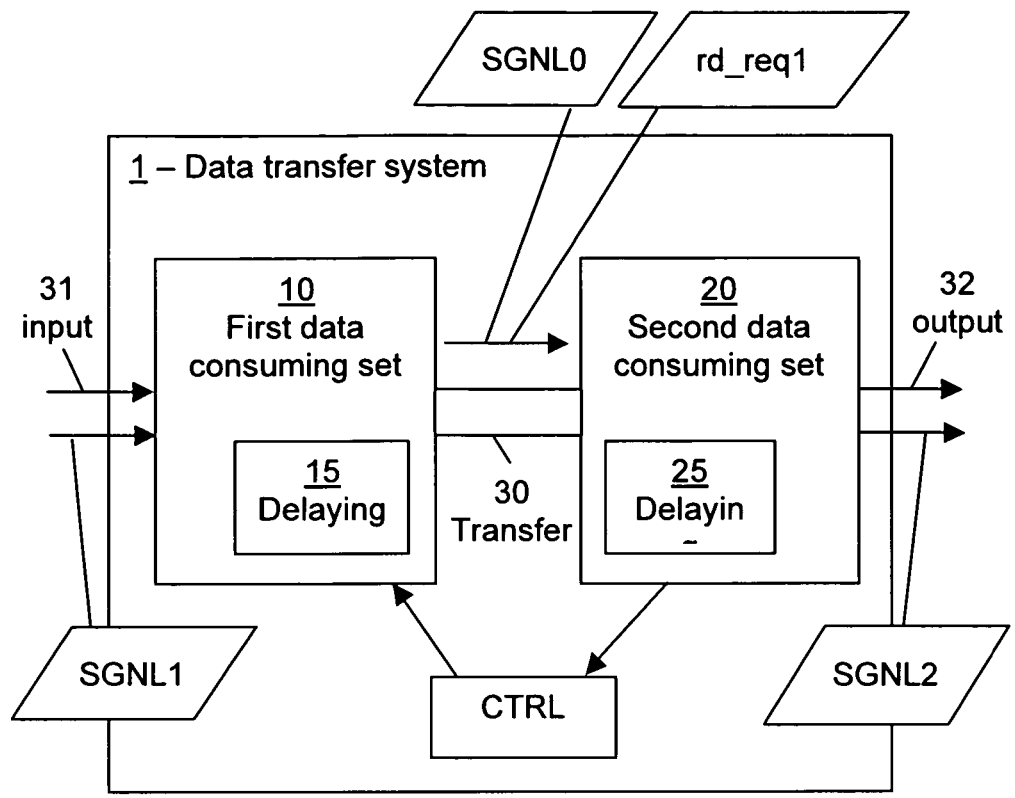
FIG. 1 is a block diagram of a data transfer system compliant with the invention.

A generic letters notation completed by numbers, like for example "FIFO1", refers to a given model object (e.g. a FIFO), which is specified into a given item (here, the first data consuming set), corresponding to a concerned entity (first set: 1, second set: 2, transfer path: 0) of the data transfer system.

Further, suffix letters "A" and "B" may be used for specifying that a similar generic object is used for the first or the second embodiment, respectively.

Also, in the described examples, same references refer to similar entities.

A data transfer system 1 (FIG. 1) is provided for transferring data signals SGNL between a system input 31 and a system output 32. It comprises a first data consuming set 10 and a second data consuming set 20, as well as data transfer paths 30 between both sets 10 and 20.

The first set 10 is designed to successively receive the data signals SGNL in an input form SGNL1 from the input 31, keep them inside after their writing therein, and provide them in a transfer form SGNL0 to the transfer paths 30 after their reading, for transmission to the second set 20. Likewise, the second set 20 is designed to successively receive the data signals SGNL0 from the first set 10, keep them inside after their writing therein, and provide them in an output form SGNL2 to the output 32 after their reading.

Further, the first set 10 and second set 20 comprise respective delaying units 15 and 25, able to delay in a desired way the time period between the reading of the data signals SGNL0 from the first set 10 and their writing to the second set 20 (which may include the reading in the first set 10, the transfer itself and/or the writing in the second set 20). They offer flexible tool for synchronization purpose.

A specific feature of the data transfer system 1 is that read requests rd_req1, used internally in the first set 10 for triggering the reading of the data signals SGNL0 to be transferred, are transmitted to the second set 20 with the data signals SGNL0. Thus, the first set 10 and the transfer paths 30 are adapted for such an additional transmission, while the second set 20 is able to exploit the received read requests rd_req1 for synchronization between both sets 10 and 20. Namely, those received read requests rd_req1 can be used as write requests wr_req2 in the second set 20.

This synchronization relies on a control unit CTRL belonging to the data transfer system 1, which is here represented (FIG. 1) in none of the sets 10 or 20. This control unit CTRL is in charge of exploiting control signals from the first and second sets 10 and 20, to appropriately control the execution of the read requests rd_req1 in the first set 10. In preferred achievements, the exploited control signals include the emptying state in the first set 10 ("empty", "almost empty") and the filling state in the second set 20 ("full", "almost full"). A very precise timing for writing the data signals SGNL0 in the second set 20 can thus be executed.

In practice, the control unit CTRL can be shared into two control sub-units respectively present in both sets 10 and 20. However, in preferred embodiments, it consists in a unique unit incorporated in only one of the sets 10 and 20. This leads to more simplicity and increased efficiency thanks to centralized control.

The data transfer system 1 of FIG. 1 will now be illustrated in two particular embodiments, in which the unique control unit CTRL is implemented respectively in the first set 10 and in the second set 20, as a hardware block forming a control logic unit.

Figure 2:
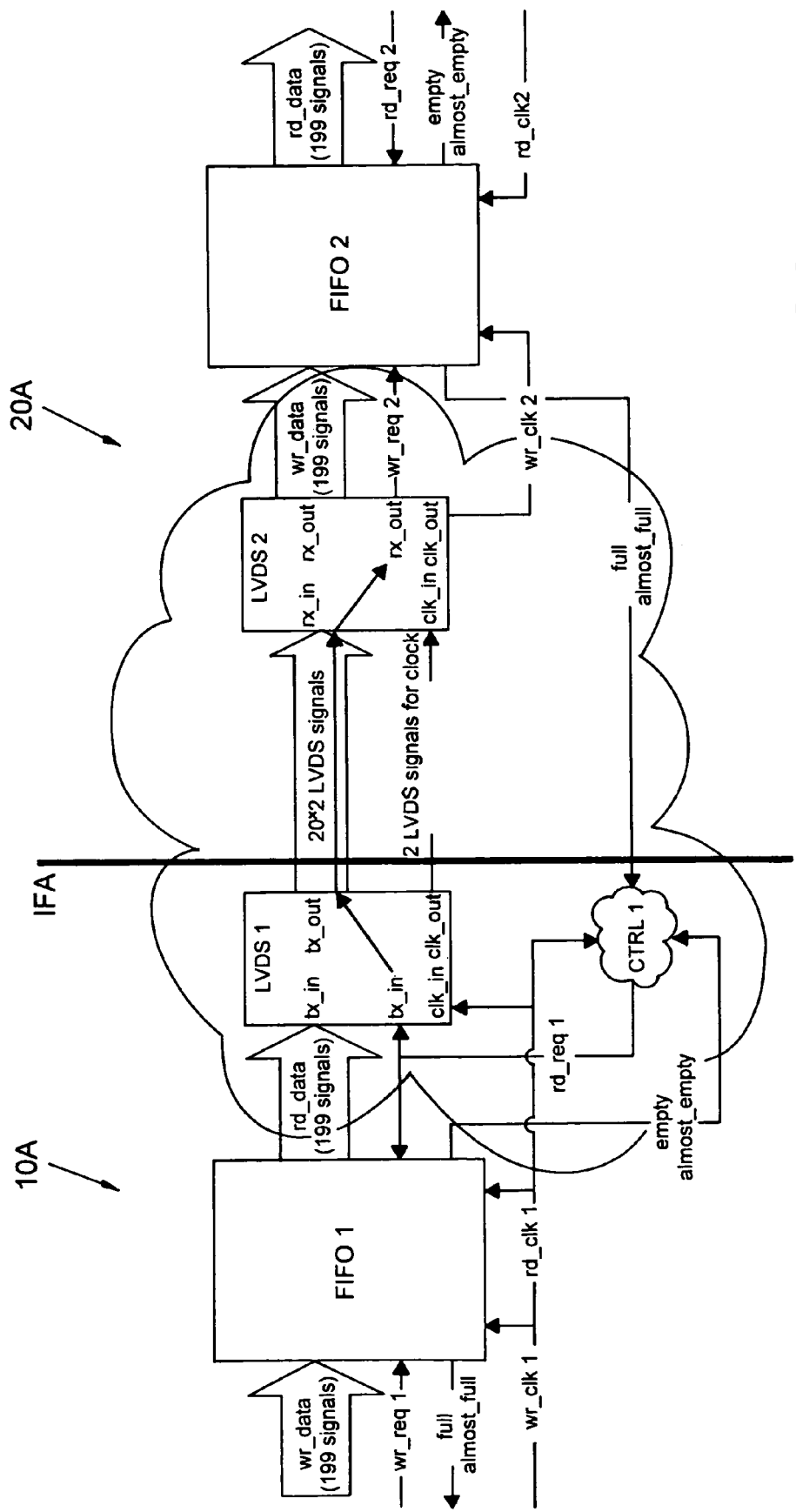
FIG. 2 represents a first embodiment of the data transfer system of FIG. 1.

In the first embodiment (FIG. 2), the first data consuming set 10, noted 10A, consists in a first FPGA comprising a first FIFO noted FIFO1 and a first LVDS cell noted LVDS1 downstream the first FIFO. On its part, the second data consuming set 20, noted 20A, consists in a second FPGA comprising a second FIFO noted FIFO2 and a second LVDS cell noted LVDS2 upstream the second FIFO. The control unit CTRL, noted CTRL1, is implemented in the first set 10. The transfer paths 30 are represented as reduced to an FPGA interface noted IFA.

Each of the FIFO components FIFO1 and FIFO2 has a read port side and a write port side, able to be used with respective independent clocks. Thus, they are able to change a clock domain inside the data consuming set 10 or 20. Each of those ports is able to generate on its clock domain the following status signals:
  "empty" (read port side), meaning that the memory is empty,
  "almost empty" (read port side), meaning that the memory is no far from empty, which can be generated based on a predetermined number of words noted "word_number",
  "word_number" (read port side),
  "full" (write port side), meaning that the memory is full,
  "almost full" (write port side), meaning that the memory is no far from full, which can be generated based on "word_ number" parameter;
  and "word_number" again (write port side).

Thus, the parameter "word_number" can be generated twice, one for each clock domain.

Generally, the status signal has a latency of 3 periods. It means for example, when the last word of the FIFO is read, that the control unit CTRL1 is informed that the FIFO is empty only 3 periods after the read request rd_req asserted to "1", namely with a signal active to high.

In the present implementation (FIG. 2), the component FIFO1 of set 10 is exploited with one and same clock domain, which corresponds to a same first clock noted clk1 and used for writing (wr_clk1) as well as for reading (rd_clk1 that is the same as wr_clk1, the write and read ports being synchronous). By contrast, the component FIFO2 of set 20 is implemented with two clock domains, which correspond respectively to a second writing clock wr_clk2 and a second reading clock rd_clk2.

In a specific implementation, the first FPGA (transmitting) corresponds to a MAC layer, which has its own clock clk1 provided by a local CPU (for "Central Processing Unit"), while the second FPGA (receiving) corresponds to a PHY layer, which must use another clock rd_clk2 for RF transmission.

In operation, on the transmitting side (set 10), a proprietary hardware stores its data in the FIFO1 component using its write port, and on the receiving side, the proprietary hardware receives its data from the FIFO2 component using its read port. The concerned input data signals SGNL1 (arriving as wr_data) and output data signals SGNL2 (leaving as rd_data) include in the illustration example, 199 signals (each signal can be a bit).

The read request rd_req1 of the transmitting FIFO1 component is inserted with the data to transport, and is used as write request wr_req2 on the receiving FIFO2 component, after transport through the LVDS cells LVDS1 and LVDS2. In the illustration example, the data signals SGNL0 transferred between those two cells are made of 20×2 LVDS signals, including an additional couple of signals for the read request rd_req1 (couples of differential signals are used for high frequency transport of LVDS signals, like for example with RS-232 standard data interface; further, a factor 10 is applied to the data for LVDS processing). Also, special LVDS signals are also transmitted for clock data, consisting in the example illustration in 2 LVDS signals providing a frequency given by:

$$Frd\_clock1 \times 10/a,$$

where Frd_clock1 is the clock frequency for reading from the component FIFO1, and a is a predefined integer coefficient (introduced by the user, making transmission easier). The clock clk1 is regenerated at reception from those signals.

In a preferred implementation, the "almost full" signal of the component FIFO2, noted wr_almost_full2 is set as described below. This enables to have an efficient control logic code while keeping the full bandwidth. The applied rule is given by:

wr_almost_full2=="1" when wr_word_nb2>=(word_
      depth2−fifo_latency2−propagation_delay−
      resync_latency) else wr_almost_full2=="0", with:
  word_depth2 is the maximum number of words that the receiving component FIFO2 can store;
  fifo_latency2 is the period number for updating the "almost_full2" signal;

propagation_delay is the propagation time, rounded up to the closest period number, for transmitting the data through the LVDS signals;

resync_latency is the period number (re-synchronization latency) required for latching the "full" and the "almost full" signals coming from the receiving component FIFO2, and wr_word_nb2 is the number of written words at the receiving component FIFO2.

The setup time consists in the minimum delay before the next clock count, while the hold time is the duration during which a signal has to be maintained at a same level after the clock count. Both setup and hold times have to be respected.

If the propagation time is not a multiple of the clock period (the setup and hold time would then not be respected), it is required to perform a change of clock domain of the signals. In the case of the LVDS transport, if the distance between the two FPGAs is not long, the times of setup and hold are respected, and it can be considered that the writing clock wr_clk2 for the FIFO2 component is identical to the reading clock (which is also the writing clock) clk1 for the FIFO1 component.—namely, tresync_latency is worth 0.

With this configuration, the "almost full" signal of the receiving FIFO2 component almost_full2 can be directly used for driving the read request signal rd_req_of the transmitting FIFO1 component.

During the process, if at one particular moment the number of words contained in the receiving FIFO2 component is equal to:

(word_depth2−fifo_latency2−propagation_delay−resync_latency)

and if there is always a word ready to be transmitted from the transmitting FIFO1 component, then the control unit CTRL1 generates a number of consecutive read requests rd_req1 at the transmitting FIFO1 component which is equal to:

(fifo_latency2+propagation_delay+resync_latency)

because it is the time required for having an almost full signal wr_almost_full2 set to "1" at the receiving FIFO2 component. When the wr_almost full2 signal is set to "1", the control unit CTRL1 has to wait during a number of periods given by:

(fifo_latency2+propagation_delay+resync_latency)

between the previous asserted read request rd_req1 at the transmitting FIFO1 component and the check of the "full" signal at the receiving FIFO2 component. After this number of periods, and if the "full" signal remains set to "0", then the control unit CTRL1 can set the read request signal rd_req1 to "1" for one period.

The hardware control logic is thus given by:

```
If   ((almost_full2 = "0") and (almost_empty1 = "0")) or
     ((almost_full2 = "0") and (empty1 = "0") and (wait_cnt1 = "0")) or
     ((almost_empty = "0") and (full2 = "0") and (wait_cnt2 = "0")) then
     rd_req == "1";
     wait_cnt1 == fifo_latency1 ;
     wait_cnt2 == fifo_latency2 + propagation_delay + resync_latency;
else
     rd_req1 == "0";
     if wait_cnt1 /= "0" then
         wait_cnt1 == wait_cnt1 − 1;
     end if;
     if wait_cnt2 /= 0 then
         wait_cnt2 == wait_cnt2 − 1;
     end if;
end if,
``` where:

the notation "/=" stands for different ($\neq$), almost_empty1 is the "almost empty" signal for the transmitting FIFO1 component, empty1 is the "empty" signal for the transmitting FIFO1 component, full2 is the "full" signal for the receiving FIFO2 component, wait_cnt1 is the wait counter for the transmitting FIFO1 component, wait_cnt2 is the wait counter for the receiving FIFO2 component, fifo_latency1 is the latency, in number of periods, for the transmitting FIFO1 component, and fifo_latency2 is the latency, in number of periods, for the receiving FIFO2 component.

In the illustration example, the LVDS latency if 2 periods, the FIFO2 latency fifo_latency2 is 3 periods, the FIFO1 latency fifo_latency1 is 1 period, the re-synchronization latency resync_latency is null (because the FPGAs are close) and the FIFO word depth word_depth1 or word_depth2 is 20 words for the FIFO1 or FIFO2 components, respectively.

Then, the "almost empty" signal for the FIFO1 component, almost_empty1, is given by:

almost_empty1=="1" when rd_word_nb1<="1" else "0", where rd_word_nb1 is the number of read words in the transmitting component FIFO1, and the "almost full" signal for the FIFO2 component, almost_full2, is given by:

almost_full2=="1" when wr_word_nb2>="15" else "0".

Figure 3:
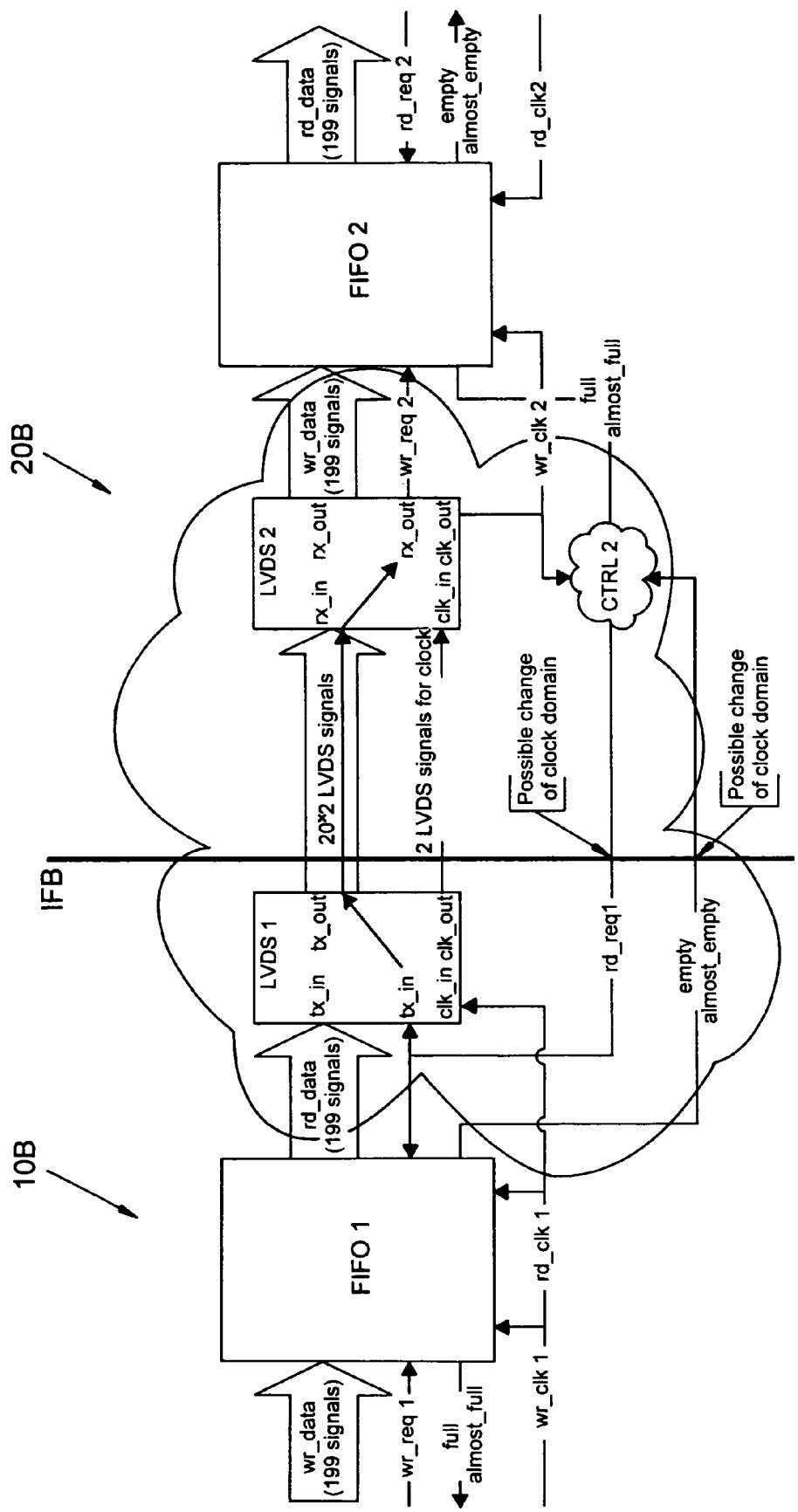
FIG. 3 represents a second embodiment of the data transfer system of FIG. 1.

In the second embodiment (FIG. 3), the first and second FPGAs are similar to the ones for the previous first embodiment. Thus, they comprise respectively the first and second data consuming sets 10 and 20, noted 10B and 20B, which include similar first and second FIFO, respectively FIFO1 and FIFO2, and first and second LVDS cells, respectively LVDS1 and LVDS2, and are interconnected through an interface IFB. However, the control unit CTRL, noted CTRL2, is here implemented in the second set 20.

This solution is less interesting than the previous one, because more signals could change of clock domain.

Figure 4:
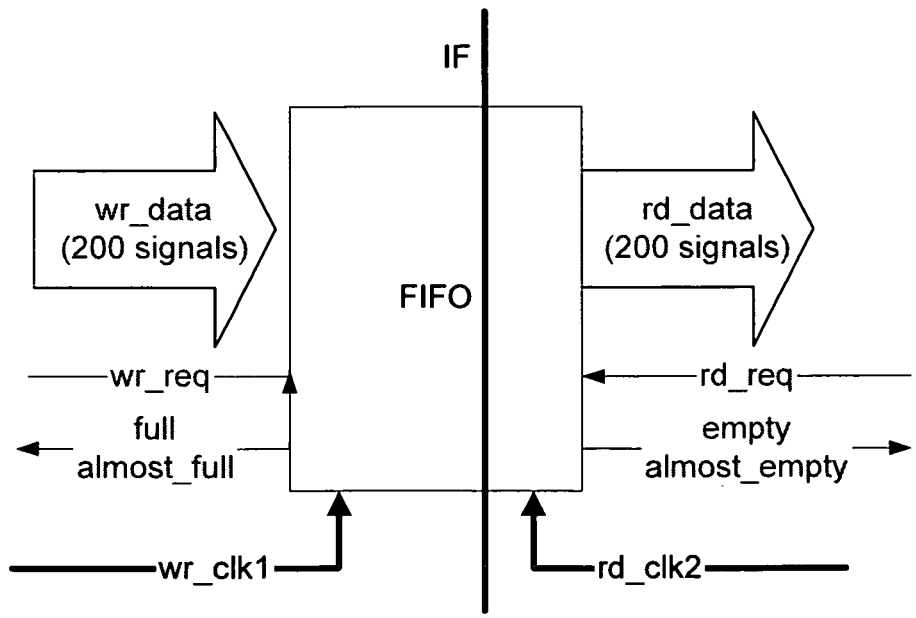
FIG. 4 shows as a global black box the functionalities of the data transfer system resulting from the first embodiment of FIG. 2 or the second embodiment of FIG. 3.

Both first and second embodiments (FIGS. 2 and 3) lead to a behaviour identical to that of a unique FIFO (FIG. 4) which would have a latency equal to the latency of the whole system (the interface between the FPGAs being noted IF and suggested as a line cutting the system on the Figure), and would be submitted to global write and read requests (respectively noted wr_req and rd_req). The global latency in this synthetic system, namely the latency between the input request signals and the output status signals, is then given by the results shown in table 1.

TABLE 1

Global latency for the whole data transfer system 1

| From | To | Maximum latency | Typical value |
|---|---|---|---|
| wr_req2 | full2, almost_full2 | fifo_latency1 | 1 |
| rd_req1 | empty1, almost_empty1 | fifo_latency2 | 3 |
| wr_req2 | empty1, almost_empty1 | fifo_latency1 + propagation_delay + fifo_latency2 | 1 + 2 + 3 |

TABLE 1-continued

Global latency for the whole data transfer system 1

| From | To | Maximum latency | Typical value |
|---|---|---|---|
| rd_req1 | full2, almost_full2 | fifo_latency1 + resync_latency + fifo_latency2 | 3 + 0 + 1 |

The process takes into account the total propagation delay between the request to read a data from the transmitting FIFO1 component, and the update of status signals of the receiving FIFO2 component. The programmer can take advantage of the timing of each status signal for optimising the hardware control logic.

What is claimed is:

1. Data transfer system for transferring data signals between a system input and a system output, said system comprising:
   a first data consuming set, designed to receive said data signals from said system input, to write said data signals in said first data consuming set, and to read said data signals from said first data consuming set for sending said data signals towards a second data consuming set,
   said second data consuming set, designed to receive said data signals from said first data consuming set, to write said data signals in said second data consuming set, and to read said data signals from said second data consuming set for sending said data signals to said system output,
   and transfer means for transferring said data signals from said first data consuming set to said second data consuming set,
   wherein
   said first data consuming set comprises a first FIFO memory storing said data signals for delaying the writing in said second data consuming set of said data signals read from said first data consuming set and said first data consuming set comprises a first Low Voltage Differential Signaling cell placed at the output of the first FIFO memory;
   said second data consuming set comprises a second FIFO memory storing said data signals for further delaying the writing in said second data consuming set of said data signals read from said first data consuming set, and a second Low Voltage Differential Signaling cell placed at the input of the second FIFO memory; and
   said first data consuming set is designed to insert with said data signals to be transmitted to said second data consuming set a read request signal, said read request signal is a single bit signal which when set to '1' triggers the reading of said data signals in said first FIFO memory, said transfer means are designed to carry said read request signal with said data signals through the first and second Low Voltage Differential Signaling cells, and said second data consuming set is designed to receive said read request signal which when set to '1' triggers the writing of said data signals in said second FIFO memory;
   wherein said first data consuming set is designed to exploit a same first clock for writing said data signals in said first FIFO memory and for reading said data signals from said first FIFO memory, while said second data consuming set is designed to exploit a second writing clock for writing said data signals in said second FIFO memory and a second reading clock for reading said data signals from said second FIFO memory.

2. Data transfer system according to claim 1, wherein said second writing clock is derived from said first clock by means of said transmitted read request signal.

3. Data transfer system according to claim 1, wherein said data transfer system comprises a control unit included in only one of said first and second data consuming sets, said control unit being designed to control execution of said read request signal in said first data consuming set.

4. Data transfer system according to claim 3, wherein said control unit is included in said first data consuming set, and said second data consuming set and transfer means are designed to transfer to said control unit information on a filling state in said second data consuming set.

5. Data transfer system according to claim 3, wherein said control unit is included in said second data consuming set, and said first data consuming set and transfer means are designed to transfer to said control unit information on an emptying state in said first data consuming set.

6. Data transfer system according to claim 1, wherein said data transfer system comprises a Medium Access Control layer including said first data consuming set and a Physical layer including said second data consuming set.

7. Data transfer system according to claim 1, wherein said second data consuming set is provided for sending said data signals to a radio frequency front-end.

8. A field programmable gate array comprising:
   a data consuming set chosen among a first data consuming set in a data transfer system and a second data consuming set in the data transfer system, and
   the data transfer system for transferring data signals between a system input and a system output, the data transfer system comprising:
   a transfer means for transferring the data signals from the first data consuming set to the second data consuming set, wherein:
   the first data consuming set is designed to receive the data signals from the system input, to write the data signals in the first data consuming set, and to read the data signals from the first data consuming set for sending the data signals towards a second data consuming set, and
   the second data consuming set is designed to receive the data signals from the first data consuming set, to write the data signals in the second data consuming set, and to read the data signals from the second data consuming set for sending the data signals to the system output, and wherein:
   said first data consuming set comprises a first FIFO memory storing said data signals for delaying the writing in said second data consuming set of said data signals read from said first data consuming set and said first data consuming set comprises a first Low Voltage Differential Signaling cell placed at the output of the first FIFO memory;
   said second data consuming set comprises a second FIFO memory storing said data signals for further delaying the writing in said second data consuming set of said data signals read from said first data consuming set, and a second Low Voltage Differential Signaling cell placed at the input of the second FIFO memory;
   the first data consuming set is designed to insert with the data signals to be transmitted to the second data consuming set a read request signal, said read request signal is a single bit signal which when set to '1' triggers the reading of the data signals in the first FIFO memory, the transfer means are designed to carry the read request signal with the data signals through the first and second Low Voltage Differential Signaling cells, and the second data consuming set is designed to receive the read request signal which when set to '1' triggers the writing of the data signals in the second FIFO memory;

wherein said first data consuming set is designed to exploit a same first clock for writing said data signals in said first FIFO memory and for reading said data signals from said first FIFO memory, while said second data consuming set is designed to exploit a second writing clock for writing said data signals in said second FIFO memory and a second reading clock for reading said data signals from said second FIFO memory.

9. A non-transitory optical transmission component comprising:

a data consuming set chosen among a first data consuming set in a data transfer system and a second data consuming set in the data transfer system, and the data transfer system for transferring data signals between a system input and a system output, the data transfer system comprising:

a transfer means for transferring the data signals from the first data consuming set to the second data consuming set, wherein:

the first data consuming set is designed to receive the data signals from the system input, to write the data signals in the first data consuming set, and to read the data signals from the first data consuming set for sending the data signals towards a second data consuming set, and the second data consuming set is designed to receive the data signals from the first data consuming set, to write the data signals in the second data consuming set, and to read the data signals from the second data consuming set for sending the data signals to the system output, and wherein:

said first data consuming set comprises a first FIFO memory storing said data signals for delaying the writing in said second data consuming set of said data signals read from said first data consuming set and said first data consuming set comprises a first Low Voltage Differential Signaling cell placed at the output of the first FIFO memory;

said second data consuming set comprises a second FIFO memory storing said data signals for further delaying the writing in said second data consuming set of said data signals read from said first data consuming set, and a second Low Voltage Differential Signaling cell placed at the input of the second FIFO memory;

the first data consuming set is designed to insert with the data signals to be transmitted to the second data consuming set a read request, said read request signal is a single bit signal which when set to '1' triggers the reading of the data signals in the first FIFO memory, the transfer means are designed to carry the read request signal with the data signals through the first and second Low Voltage Differential Signaling cells, and the second data consuming set is designed to receive the read request signal which when set to '1' triggers the writing of said data signals in said second FIFO memory;

wherein said first data consuming set is designed to exploit a same first clock for writing said data signals in said first FIFO memory and for reading said data signals from said first FIFO memory, while said second data consuming set is designed to exploit a second writing clock for writing said data signals in said second FIFO memory and a second reading clock for reading said data signals from said second FIFO memory.

\* \* \* \* \*